3,203,907
POLYMERIC ORGANODIBORON COMPOUNDS
AND METHOD OF PREPARING SAME
Robert J. Brotherton, Fullerton, Calif., assignor to United
States Borax & Chemical Corporation, Los Angeles,
Calif., a corporation of Nevada
No Drawing. Filed Nov. 30, 1961, Ser. No. 156,133
8 Claims. (Cl. 260—2)

The present invention relates as indicated to a new class of polymeric organoboron compounds and has further reference to a method for preparing these polymeric compounds.

It is, therefore, the principal object of this invention to provide a new class of thermally stable polymeric organoboron compounds.

It is a further object of the present invention to provide an efficient method for preparing these thermally stable polymeric organoboron compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises polymeric organoboron compounds having the recurring structural unit

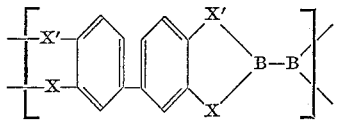

where X and X' are selected from the group consisting of imino (NH) and oxygen.

The present polymeric compounds are all thermally stable up to temperatures of over 500° C., and they will find many industrial applications as protective coatings for a variety of materials, such as, for example, different types of cloth and wire, which are to be subjected to high temperature environments. These polymeric compounds also find utility as molding and casting resins.

The preparation of the polymeric organoboron compounds of the present invention can best be illustrated by the following equation:

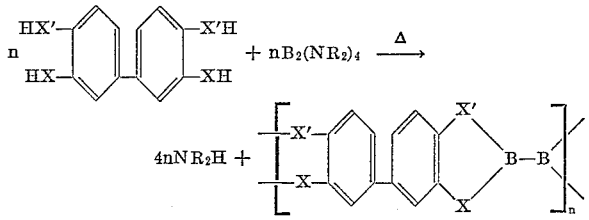

where X and X' are either imino (NH) or oxygen, and R is a straight chain aliphatic radical of from 1 to 4 carbon atoms.

The preferred method for performing the above polymerization reaction is a direct single-step process. Equimolar amounts of the reactants are added together in the presence of a heat transfer medium. The resultant reaction mixture is then heated at reflux, and the secondary amine reaction product is removed continuously in a stream of a dry inert gas which is passed over the reaction mass. After substantially all of the secondary amine reaction product has been removed, the heat transfer medium is removed by distillation and the polymeric organoboron compound is recovered as the residue.

As stated, the present reaction is performed in the presence of a heat transfer medium. The common hydrocarbon solvents, ethers and glymes such as, benzene, toluene, xylene, n-heptane, diethylether, chlorobenzene, propylether, butylether, diglyme, triglyme, etc. are all applicable as heat transfer media in the present invention. The only requirements which determine which material can be used as the heat transfer medium are that the material must be inert to the reactants, and have a boiling point greater than that of the secondary amine produced during the polymerization reaction.

The first reactant applicable to the present invention, as shown in the foregoing equation, has the formula

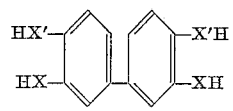

where X and X' are either imino (NH) or oxygen. Thus, when X and X' are both imino radicals the reactant is 3,3',4,4'-tetraminodiphenyl, and when either X or X' is an imino radical and the other is oxygen the reactant is 3,3'-diamino-4,4'-dihydroxydiphenyl, and when X and X' are both oxygen the reactant is 3,3',4,4'-tetrahydroxydiphenyl. These three compounds are known in the art: 3,3',4,4'-tetraaminodiphenyl is a commercially available compound while reference to the preparation of 3,3'-diamino-4,4'-dihydroxydiphenyl will be found in "Journal of The Chemical Society," 1929, page 151, and reference to the preparation of 3,3',4,4'-tetrahydroxydiphenyl will be found in "Monatsh," 1930, vol. 55, page 347.

The second group of reactants required for preparing the polymeric organoboron compounds of the present invention have the formula

$$B_2(NR_2)_4$$

where R is an alkyl radical of from 1 to 4 carbon atoms. These compounds, the tetraaminodiborons are known in the art, and reference to their preparation will be found in the Brotherton, et al. patent, U.S. #2,974,165. It will be noted here that that the amino groups of the tetraaminodiboron compounds applicable to the present invention are all derived from the corresponding secondary alkyl amines.

The following list is an enumeration of the tetraaminodiboron compounds applicable to the present invention:

Tetra(dimethylamino)diboron
Tetra(diethylamino)diboron
Tetra(di-n-propylamino)diboron
Tetra(di-n-butylamino)diboron So that the present invention can be more clearly understood, the following examples are given for illustrative purposes:

I. A mixture of 0.92 gram (0.0043 mole) of 3,3',4,4'-tetraaminodiphenyl and 0.85 gram (0.0043 mole) of tetra(dimethylamino)diboron in 10 ml. of xylene was heated under reflux for a period of about 30 hours. During the reflux period the dimethylamine produced in the polymerization reaction (91.3% of theoretical) was removed continuously in a stream of dry nitrogen. The xylene was then removed by distillation and the solid tan residue recovered was dried in vacuum at about 100° C. The polymeric product did not melt or change in appearance when heated at temperatures up to 500° C.

II. Example I was repeated except that tetra(diethylamino)diboron was used instead of tetra(dimethylamino)diboron. The results of this example were comparable to those of Example I.

III. A mixture of 3.0 grams (0.013 mole) of 3,3'-diamino-4,4'-dihydroxydiphenyl and 2.55 grams (0.013 mole) of tetra(dimethylamino)diboron in 35 ml. of xylene was heated under reflux for a period of about 20 hours. During the reflux period the dimethylamine produced in the polymerization reaction (77.6% of theoretical) was removed continuously in a stream of dry nitrogen. The xylene was then removed by distillation and the solid brown residue recovered was then dried in vacuum at about 100° C. The polymeric product did not melt or change in appearance when heated at temperatures up to about 550° C.

IV. Example III was repeated except that tetra(di-n-propylamino)diboron was used instead of tetra(dimethylamino)diboron, and toluene was used instead of xylene. The results of this example were comparable to those of Example III.

V. A mixture of 1.00 gram (0.0056 mole) of 3,3′,4,4′-tetrahydroxydiphenyl and 0.91 gram (0.0046 mole) of tetra(dimethylamino)diboron in 30 ml. of diglyme (diethyleneglycol dimethyl ether) was heated under reflux for a period of about 20 hours. During the reflux period the dimethylamine produced in the polymerization reaction (95.7% of theoretical) was removed continuously in a stream of dry nitrogen. The diglyme was then removed by distillation and the solid gray residue recovered was then dried in vacuum at about 100° C. The polymeric product did not melt or change in appearance when heated at temperatures up to about 500° C.

Other modes of applying the principle of the invention may be employed, change being made as regards the details described, provided the features stated in any of the following claims or the equivalent of such be employed.

I, therefore, particularly point out and distinctly claim as my invention:

1. Polymeric organoboron compounds of the recurring structural unit

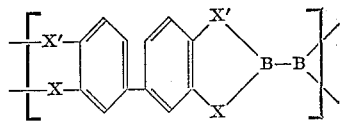

where X and X′ are selected from the group consisting of imino (NH) and oxygen, said units being bonded together through bonds selected from the group consisting of the boron-nitrogen and boron-oxygen bonds.

2. A polymeric organoboron compound of the recurring structural unit

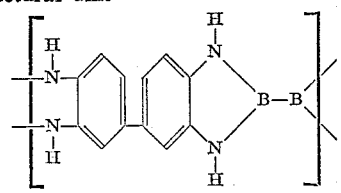

said units being bonded together through boron-nitrogen bonds.

3. A polymeric organoboron compound of the recurring structural unit

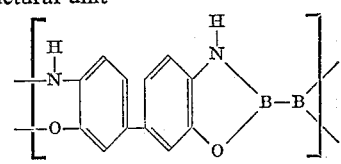

said units being bonded together through boron-nitrogen and boron-oxygen bonds.

4. A polymeric organoboron compound of the recurring structural unit

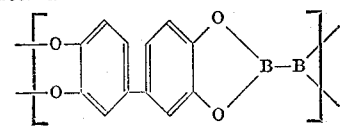

said units being bonded together through boron-oxygen bonds.

5. The method for preparing polymeric organoboron compounds of the recurring structural unit

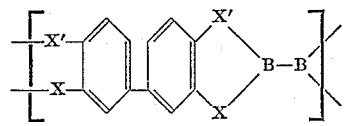

where X and X′ are selected from the group consisting of imino (NH) and oxygen, said units being bonded together through bonds selected from the group consisting of the boron-nitrogen and boron-oxygen bonds which comprises refluxing a material selected from the group consisting of 3,3′,4,4′-tetraaminodiphenyl, 3,3′-diamino-4,4′-dihydroxydiphenyl and 3,3′,4,4′ - tetrahydroxydiphenyl with a tetraaminodiboron compound having the formula $B_2(NR_2)_4$, where R is an alkyl radical of from 1 to 4 carbon atoms, in the presence of a heat transfer medium, said heat transfer medium being inert to the reactants and having a boiling point higher than that of the secondary amine reaction product, removing said secondary amine reaction product continuously in an inert gas stream, removing the heat transfer medium by distillation and recovering the polymeric organoboron compound as the residue.

6. The method for preparing a polymeric organoboron compound of the recurring structural unit

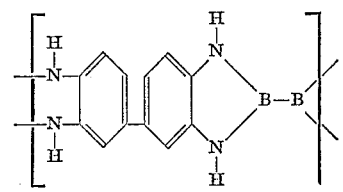

said units being bonded together through boron-nitrogen bonds which comprises refluxing a tetraaminodiboron compound having the formula $B_2(NR_2)_4$, where R is an alkyl radical of from 1 to 4 carbon atoms, with 3,3′,4,4′-tetraaminodiphenyl in the presence of a heat transfer medium, said heat transfer medium being inert to the reactants and having a boiling point higher than that of the secondary amine reaction product, removing said secondary amine reaction product continuously in an inert gas stream, removing the heat transfer medium by distillation and recovering the polymeric organoboron compound as the residue.

7. The method for preparing a polymeric organoboron compound of the recurring structural unit

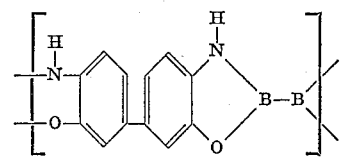

said units being bonded together through boron-nitrogen and boron-oxygen bonds which comprises refluxing a tetraaminodiboron compound having the formula $B_2(NR_2)_4$, where R is an alkyl radical of from 1 to 4 carbon atoms, with 3,3′-diamino-4,4′-dihydroxydiphenyl in the presence of a heat transfer medium, said heat transfer medium being inert to the reactants and having a boiling point higher than that of the secondary amine reaction product, removing said secondary amine reaction product continuously in an inert gas stream, removing the heat transfer medium by distillation and recovering the polymeric organoboron compound as the residue.

8. The method for preparing a polymeric organoboron compound of the recurring structural unit

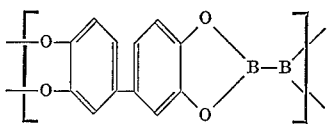

said units being bonded together through boron-oxygen bonds which comprises refluxing a tetraaminodiboron compound having the formula $B_2(NR_2)_4$, where R is an alkyl radical of from 1 to 4 carbon atoms, with 3,3',4,4'-tetrahydroxydiphenyl in the presence of a heat transfer medium, said heat transfer medium being inert to the reactants and having a boiling point higher than that of the secondary amine reaction product, removing said secondary amine reaction product continuously in an inert gas stream, removing the heat transfer medium by distillation and recovering the polymeric organoboron compound as the residue.

No references cited.

WILLIAM H. SHORT, *Primary Examiner.*

LOUISE P. QUAST, *Examiner.*